(12) United States Patent
Kyle et al.

(10) Patent No.: US 7,180,607 B2
(45) Date of Patent: Feb. 20, 2007

(54) METHOD AND DEVICE FOR CALIBRATING A MEASURING SYSTEM

(75) Inventors: Stephen Kyle, Wilts (GB); Konrad von Arb, Wangen bei Olten (CH)

(73) Assignee: Leica Geosystems AG, Heerbrugg (CH)

( * ) Notice: Subject to any disclaimer, the term of this patent is extended or adjusted under 35 U.S.C. 154(b) by 545 days.

(21) Appl. No.: 10/713,325

(22) Filed: Nov. 14, 2003

(65) Prior Publication Data

US 2004/0136012 A1 Jul. 15, 2004

(30) Foreign Application Priority Data

Nov. 15, 2002 (CH) .................... 1923/02

(51) Int. Cl.
*G01J 1/10* (2006.01)
*G01C 25/00* (2006.01)
*G01B 11/14* (2006.01)

(52) U.S. Cl. ............. 356/614; 356/243.1; 702/104
(58) Field of Classification Search ........ 356/614–624, 356/243.1–243.8; 250/252.1; 606/4, 5, 606/10, 12–13; 702/104, 85
See application file for complete search history.

(56) References Cited

U.S. PATENT DOCUMENTS

| 5,007,006 A | * | 4/1991 | Taylor et al. ............... 702/97 |
| 5,973,788 A | | 10/1999 | Pettersen et al. |
| 6,055,056 A | * | 4/2000 | Kuehmstedt et al. ....... 356/601 |
| 6,666,855 B2 | * | 12/2003 | Somani et al. ............... 606/5 |
| 7,113,878 B1 | * | 9/2006 | Loferer et al. ............ 702/104 |
| 2001/0021898 A1 | | 9/2001 | Greer et al. |

FOREIGN PATENT DOCUMENTS

| EP | 0 553 266 B1 | 5/1997 |
| EP | 0 957 336 A2 | 11/1999 |

* cited by examiner

*Primary Examiner*—Hoa Q. Pham
(74) *Attorney, Agent, or Firm*—Rankin, Hill, Porter & Clark LLP

(57) ABSTRACT

A measuring system including a measuring device with a laser tracker and an opto-electronic sensor having fixed positions relative to one another and an auxiliary measuring tool with a reflector and at least three light spots, is calibrated. The auxiliary measuring tool is rigidly coupled with an arrangement of auxiliary reflectors and is moved around at least two different rotation axes. Reflector and auxiliary reflectors are registered by the laser tracker and the light spots are registered by the opto-electronic sensor. From the data of the laser tracker, positions and orientations of the reflector arrangement relative to the laser tracker and from the data of the opto-electronic sensor, positions and orientations of the light spot arrangement relative to the opto-electronic sensor are calculated and the two rotation axes relative to the reflector arrangement and the light spot arrangement are calculated. Calibration data are calculated by equating corresponding rotation axes.

18 Claims, 3 Drawing Sheets

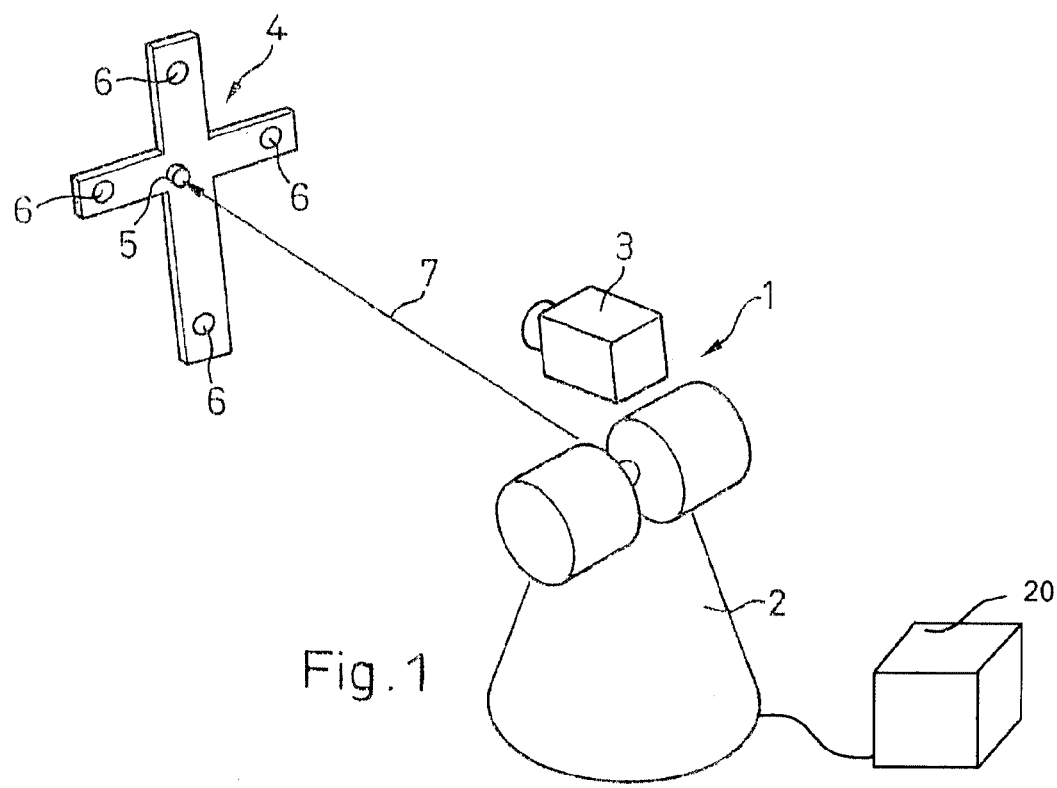
Fig. 1
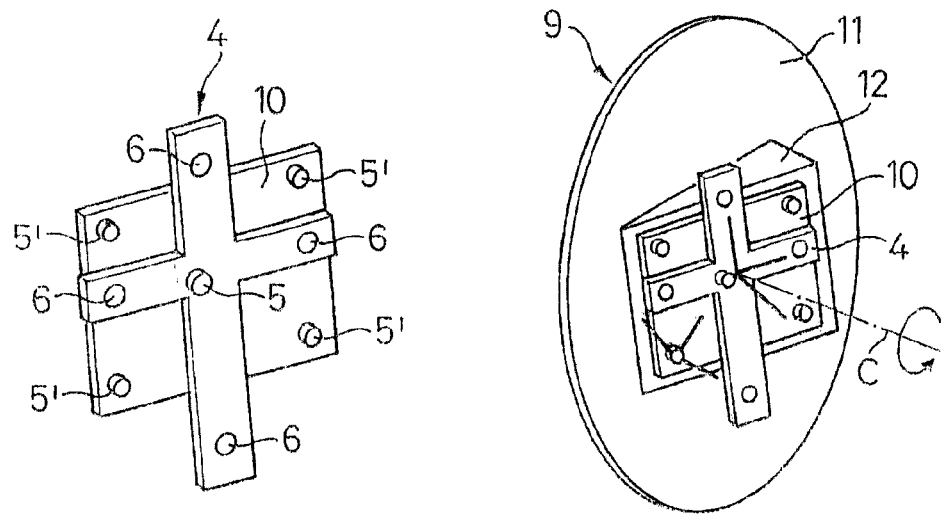
Fig. 2
Fig. 3

METHOD AND DEVICE FOR CALIBRATING A MEASURING SYSTEM

BACKGROUND OF THE INVENTION

1. Field of the Invention

The present invention is situated in the field of measuring technology (metrology) and concerns a method and a device for calibrating a measuring system that is applicable for determining spatial position and orientation of objects and that comprises a measuring device with a laser tracker and an opto-electronic sensor, a system computer, and an auxiliary measuring tool.

2. Description of Related Art

The term laser tracker or tracker in the present context is a device comprising means for generating an optical measuring beam, advantageously a laser beam, an optical system for aligning the measuring beam to a target point (e.g. cube edge prism) reflecting the measuring beam back to the measuring device in parallel, means for analysing the reflected measuring beam for determining the absolute or relative path length of the beam, and means for detecting the absolute or relative direction of the measuring beam. From the recorded data regarding beam path length and beam direction between laser tracker and reflector (target point), spatial co-ordinates of the reflector relative to the laser tracker can be calculated. The optical system of the tracker advantageously is equipped such that the measuring beam is able to automatically track a moving target point. Laser trackers of the Leica Geosystems company are available on the market. Other devices such as, for example, motorised theodolites comprising distance measurement means, also fall under the above definition.

The term opto-electronic sensor in the present context is a device equipped for creating an electronically evaluatable, two-dimensional image of a spatial arrangement of light spots. The opto-electronic sensor comprises a two-dimensional, light-sensitive array and a combination of lenses with an optical axis. It is, for example, a CCD or CID-camera or it is based on a CMOS-array. For evaluating the two-dimensional image, means are provided for identifying the imaged light spots, for determining the centers of gravity of the imaged light spots and for determining the image co-ordinates of these centers of gravity. From these coordinates, spatial angles between the optical axis of the sensor and the direction from the sensor to the light spots can be calculated.

The laser tracker and the opto-electronic sensor in the measuring device of the measuring system presented here are installed one on top of the other such that their positions relative to one another are fixed. For example, the laser tracker and sensor are rotatable together around an essentially vertical axis, and the sensor can be pivoted upwards and downwards independent of the laser tracker.

Measuring devices with a laser tracker and an opto-electronic sensor in accordance with the above definitions and with a system computer for carrying out the mentioned calculations and their utilization for determining spatial position and orientation of objects carrying light spots and reflectors belong to the state of the art. Measuring devices of this kind are available on the market (e.g., theodolite type T3000V/D of the Leica company). When using a measuring device of the named type for determining position and orientation of an object, at least three light points to be detected by the opto-electronic sensor and at least one reflector reflecting the measuring beam of the laser tracker are arranged on the object in known positions relative to the object. The light spots to be registered by the opto-electronic sensor may be active light sources (e.g. light-emitting diodes) or reflectors to be illuminated, wherein the light spots are equipped or arranged such that they can be identified in an unequivocal manner.

In many applications not the object, the position and orientation of which is sought, is measured itself but an auxiliary measuring tool, which belongs to the measuring system and which, for the measurement, is brought into a position relative to the target object, which position is mechanically defined or is determined during the measurement. From the measured position and orientation of the auxiliary measuring tool the sought position and, if so required, orientation of the target object can be calculated. Auxiliary measuring tools are, for example, so-called touch tools that are positioned on a target object with their contact point in contact with the target object. Light spots and reflector of the touch tool have exactly known positions relative to the contact point. Touch tools of the type are available on the market (e.g., Optrek 3-D Co-ordinate Measuring Stylus of Northern Digital Corp. Canada). However, the auxiliary measuring tool may also be a hand-held scanner for contact-free surface measurements. The scanner is equipped for distance measurement with the aid of a measuring beam and it comprises light spots and reflectors in known positions relative to direction and position of the measuring beam. A scanner of this kind is described, for example, is discussed in the publication EP-0553266 (Schulz).

It is obvious that, in a measuring system as described above, the laser tracker and the reflector (or the reflectors) of the auxiliary measuring tool, on the one hand, and the opto-electronic sensor and the light spots of the auxiliary measuring tool, on the other hand, represent separate measuring systems being coupled with one another through the relative arrangement of laser tracker and opto-electronic sensor in the measuring device and through the relative arrangement of light spots and reflector or reflectors on the auxiliary measuring tool. For correlating the two measuring systems, calibration is necessary. Calibration concerns the laser tracker and the opto-electronic sensor of the measuring device and the auxiliary measuring tool.

SUMMARY OF THE INVENTION

The present invention is directed toward a method and a device that serves to calibrate or correlate the two measuring systems mentioned above. Use of the method and device according to the invention allows a very simple calibration of a measuring system comprising a system computer, a measuring device with a laser tracker and an opto-electronic sensor, and an auxiliary measuring tool with at least three light spots and at least one reflector. The calibration consists of measuring steps and calculating steps producing calibration data for coupling measured data determined by the laser tracker and by the opto-electronic sensor with respect to the auxiliary measuring tool such that the measured data can at all times be related to a common coordinate system, e.g. of the laser tracker. The measuring steps of the calibration method in accordance with the invention, for which the device according to the invention is used, are to be so simple that they can be carried out with great accuracy by a user of the measuring system, e.g. on commissioning a new auxiliary measuring tool.

The calibration procedure according to the invention comprises essentially the following steps:

If the auxiliary measuring tool comprises less than three reflectors, the number of reflectors is complemented to at least three with auxiliary reflectors. If so required, the relative positions of reflector(s) and auxiliary reflectors are determined.

The auxiliary measuring tool, if applicable together with the auxiliary reflectors, is rotated around at least two rotation axes that, relative to the auxiliary measuring tool, are different from one another. In at least two rotation positions relative to each one of the rotation axes, the at least three light spots of the auxiliary measuring tool are registered by the opto-electronic sensor and the at least three reflectors are registered by the laser tracker. For all these measurements the position of the measuring device remains unchanged.

For each one of the rotation positions of the auxiliary measuring tool, the position and orientation of the reflector arrangement relative to the laser tracker and of light spot arrangement relative to the opto-electronic sensor are calculated from the measured data by the laser tracker and by the opto-electronic sensor registered in the above-described measuring step.

From the positions and orientations of the reflector arrangement and of the light spot arrangement, the direction and position of the at least two rotation axes relative to the reflector arrangement and relative to the light spot arrangement are calculated. For this purpose, data with respect to the known, relative positions of the light spots and, if applicable, of the reflectors are necessary.

Corresponding rotation axes calculated relative to the reflector arrangement and relative to the light spot arrangement are then equated with one another and, from these equations, calibration data are calculated, which for the calibrated pair of measuring device and auxiliary measuring tool allow data transformation from the tracker/reflector system to the sensor/light spot system and vice versa. Such calibration data is, for example, necessary for calculating any position and orientation of the auxiliary measuring tool relative to any coordinate system from data registered by the tracker and the sensor.

The calibration device in accordance with the invention serves to bring the auxiliary measuring tool into the various rotation positions around the different rotation axes and, if so required, for combining it with auxiliary reflectors. For this purpose, the device comprises installation means for accurately mounting the auxiliary measuring tool in different orientations, wherein the auxiliary measuring tool may be equipped with installation means co-operating with the installation means of the calibration device. If auxiliary reflectors are necessary for the calibration (if the auxiliary measuring tool comprises less than three reflectors), the calibration device further comprises a reflector element to be rigidly coupled with the auxiliary measuring tool and to be mounted on the calibration device in the different orientations, together with the auxiliary measuring tool.

The calibration device, for example, comprises a revolving table on which the auxiliary measuring tool, if so required together with the reflector element, is mounted in at least two different orientations, and which is rotated for bringing the auxiliary measuring tool into different rotation positions. The calibration device may also be designed non-rotating and allowing installation positions and orientations for auxiliary measuring tool and possibly reflector element, which equal different rotation positions around at least two rotation axes being different relative to the auxiliary measuring tool.

BRIEF DESCRIPTION OF THE DRAWINGS

These and further features of the invention will be apparent with reference to the following description and drawings, wherein all Figures illustrate the same advantageous embodiment of the reflector and target point arrangement on the auxiliary measuring tool, which, however, does not represent a condition for the invention.

FIG. 1 shows an exemplary, as such known measuring system, for which the calibration method and device according to the invention are suitable;

FIG. 2 shows the auxiliary measuring tool of the measuring system in accordance with FIG. 1, the instrument being provided with auxiliary reflectors for calibration;

FIG. 3 shows an exemplary embodiment of the calibration device according to the invention, which device is suitable for calibration of the measuring system according to FIG. 1;

FIGS. 4 to 6A and 6B show successive steps of the calibration method according to the invention; and, FIG. 7 shows a reflector being also equipped as a light spot and being applicable for the auxiliary measuring tool.

DETAILED DESCRIPTION OF THE PREFERRED EMBODIMENTS

Figure 4:
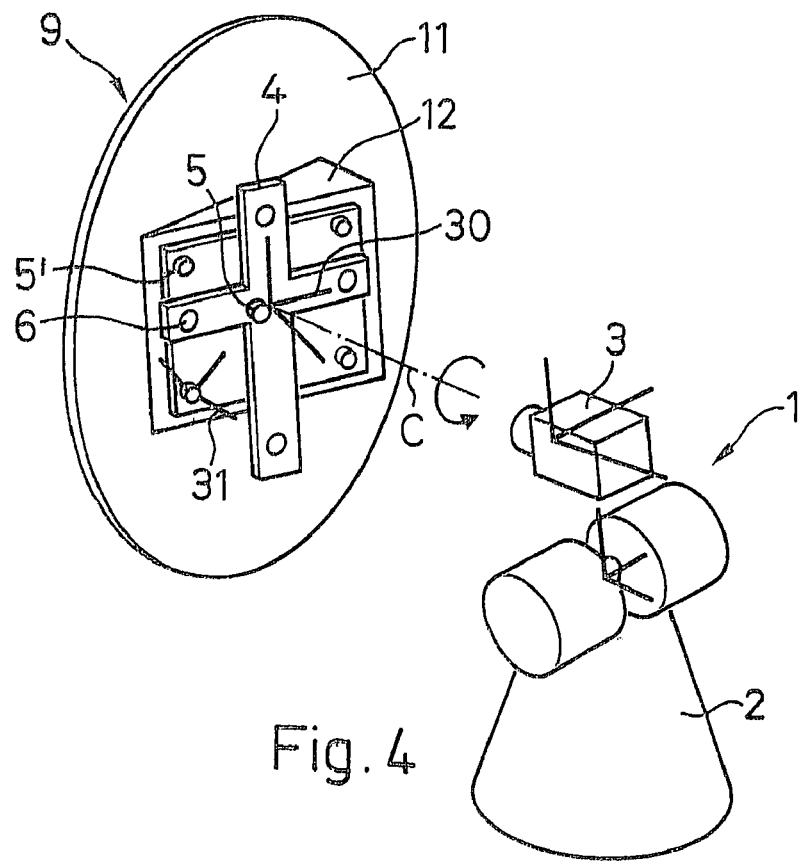

FIG. 1 shows in a very schematic manner an exemplary, as such known measuring system, for which the calibration method and device according to the invention are suitable. The measuring system comprises a measuring device 1 in which a laser tracker 2 and an opto-electronic sensor 3 are installed one on top of the other or integrated into one another such that their relative positions are fixed. The measuring system further comprises a system computer 20.

The measuring system further comprises an auxiliary measuring tool 4, which in the case illustrated comprises one reflector 5 and four identifiable light spots 6. In FIG. 1 as well as in all following drawing figures, only those parts of the auxiliary measuring tool relevant for the calibration are shown, namely the arrangement of reflector 5 and light spots 6. The auxiliary measuring tool may comprise any shape suitable for its measuring function. The reflector 5 is equipped for parallel reflection of the measuring beam 7 of the laser tracker 2. For example, the reflector is a cube corner prism. The light spots 6 to be registered by the opto-electronic sensor are, for example, LEDs or reflecting spots being correspondingly illuminated for measurements. The light spots 6 are unequivocally identifiable either through their relative arrangement or through corresponding identification means.

A three-dimensional arrangement (not in one plane) of the four light spots 6 and an arrangement of the reflector in a central zone of the light spot arrangement are known to be advantageous for measurements. This is also advantageous for the calibration in accordance with the invention, but is not a condition. An auxiliary measuring tool with a single reflector is advantageous, particularly for applications in which the auxiliary measuring tool 4 is automatically tracked by the laser tracker 2.

As already mentioned further above, the auxiliary measuring tool 4 is, for example, a touch tool, the contact point of which is positioned on points to be measured. The auxiliary measuring tool may also be a scanner being equipped for contract-free distance measurement and being guided over an object to be measured by hand.

FIG. 2 illustrates the auxiliary measuring tool 4 of FIG. 1 being combined with four auxiliary reflectors 5'. These auxiliary reflectors 5' are arranged on a reflector element 10

(e.g., a reflector plate). The reflector element 10 for an auxiliary measuring tool with less than three reflectors is a necessary component of the calibration device. The reflector element 10 is designed to be rigidly coupled with the auxiliary measuring tool. The arrangement of the in total e.g. five reflectors advantageously is three-dimensional.

FIG. 3 depicts an exemplary embodiment of the calibration device 9 according to the invention, wherein the auxiliary measuring tool of FIGS. 1 and 2 is installed on the calibration device. The device comprises the reflector element 10 of FIG. 2, which is designed to be rigidly coupled with the auxiliary measuring tool, and a revolving table 11 with a stationary rotation axis C and carrying wedge shaped orientation element 12. The orientation element 12 comprises installation means (not shown) for mounting the auxiliary measuring tool 4 or the auxiliary measuring tool 4 rigidly coupled to the reflector element 10 respectively in at least two different orientations. In place of the revolving table 11 an element can be provided that comprises at least two groups of at least two installation positions for the auxiliary measuring tool 4 possibly together with the reflector element 10, wherein the orientations of each group are such that they are convertible into one another by rotation around a stationary, virtual rotation axis.

It appears that theoretically the angle between the two different rotation axes to be established by mounting the auxiliary measuring tool to the calibration device is optimally 90°. When utilising reflectors with an opening angle of ±20°, the named angle can only be around 25 to 30°. However, the smaller angle gives satisfactory accuracy also.

Figure 5:
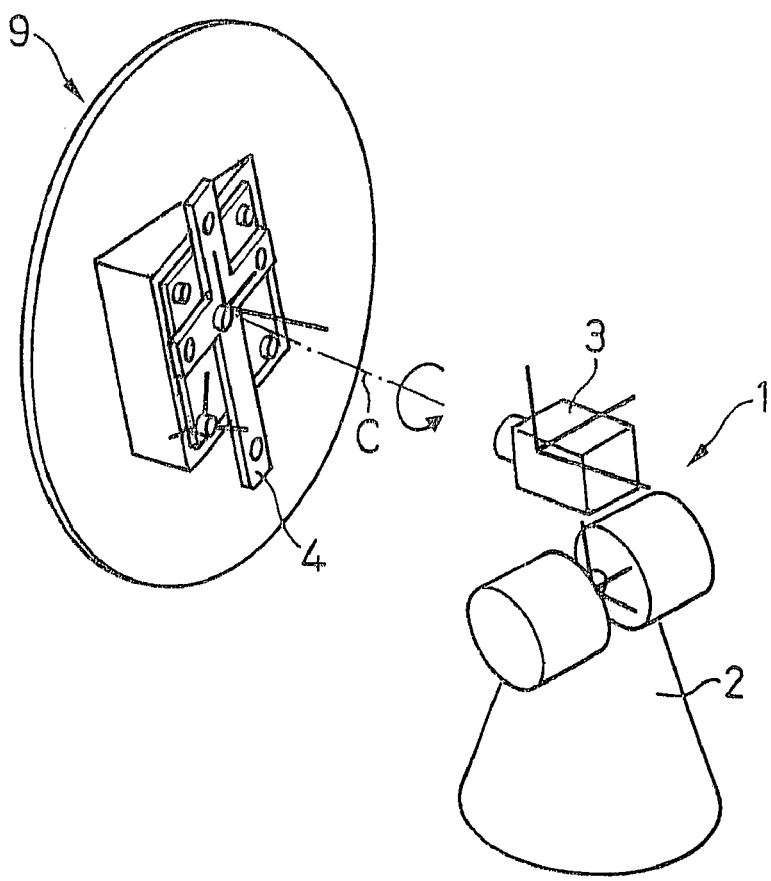

FIGS. 4 and 5 illustrate the measuring arrangement for the method in accordance with the invention. The measuring device 1 advantageously is positioned relative to the calibration device 9 such that the optical axis of the opto-electronic sensor 3 is approximately aligned to the rotation axis C of the revolving table, and such that the light spot arrangement of the auxiliary measuring tool 4 can be registered fully and as large as possible on the image surface of the opto-electronic sensor in all foreseen rotation positions.

FIG. 4 illustrates the measuring arrangement for a first rotation axis relative to the measuring instrument 4. FIG. 5 illustrates the same measuring arrangement for a second rotation axis relative to the measuring instrument 4. The two measuring arrangements differ by the fact that the auxiliary measuring tool 4 together with the reflector element 10 is turned by 180° on the orientation element 12 such that the stationary rotation axis C traverses the measuring instrument 4 advantageously in a central zone in both cases, but in two different directions and advantageously in two different places.

If the relative positions of the light spots and, if so required, of the reflectors and auxiliary reflectors are not known in advance, these have to be determined for the calculation of the calibration data. The relative positions of the light spots are, for example, determined by multiple registration with the opto-electronic sensor or a similar device and by bundle adjustment. For this purpose, a coordinate system 30 proprietary to the light spot arrangement is selected. The coordinate system 30 advantageously has an origin in the central zone of the light spot arrangement and a z-axis, which, in the calibration arrangement, is directed towards the measuring instrument 1. The relative positions of the reflectors, for example, are determined with the tracker or with another device with similar functions. For this purpose, a coordinate system 31 proprietary to the reflector arrangement is selected, the origin of which lies in one of the auxiliary reflectors and the z-axis of which stands vertically on the reflector plate.

From the measured data registered with the arrangements according to FIGS. 4 and 5 by the laser tracker and the opto-electronic sensor and regarding, for each orientation of the auxiliary measuring tool (each different rotation axis), at least two rotation positions of the light spot arrangement and of the reflector arrangement, data regarding the relative positions and orientations of the light spot arrangement relative to the opto-electronic sensor and data of the relative positions and orientation of the reflector arrangement relative to the laser tracker are computed, for which purpose various, as such known mathematical models are available.

Positions and orientations of the light spot arrangement relative to the opto-electronic sensor are calculated, for example, with an iterative reverse intersection method, wherein as starting values a position of the origin of the coordinate system 30 on the optical axis of the opto-electronic sensor and a rotation matrix based on parallel projection and taking the optical axis as rotation axis are utilised.

Positions and orientations of the reflector arrangement relative to the laser tracker may be calculated, for example, by aligning the local axes (local axis alignment), for which purpose the relative positions of the reflectors in the reflector arrangement have to be known. Alternatively, a mathematical circle model (e.g., Axyz-module of Leica) can be used.

Figure 6A:
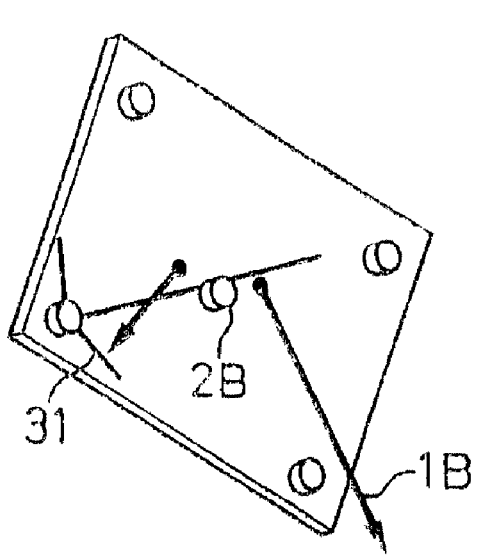
Figure 6B:
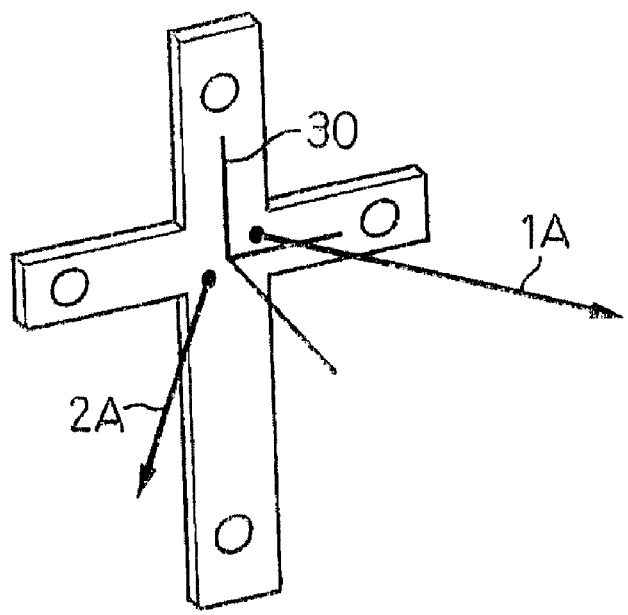

In a further calculation step, for each rotation axis the direction and position in the coordinate systems 30 and 31 are calculated from positions and orientations associated with the specific rotation axis and determined for the reflector arrangement and the light spot arrangement in the previous steps. In FIGS. 6A and 6B, the reflector arrangement and the light spot arrangement with the coordinate systems 30 and 31 are separately illustrated and the two rotation axes in the two systems are designated with 1A and 1B on the one hand and 2A and 2B on the other hand.

In a third calculation step, in principle, axes 1A and 1B and axes 2A and 2B are equated with one another, from which equations results the sought calibration data. The calibration data is used for coordinate transformation from the coordinate system 30 into the coordinate system 31 or vice versa or, more generally speaking, for transforming measuring data originating from the laser tracker in relation to the reflector (or reflectors) of the auxiliary measuring tool to calculations, which refer to measuring data originating from the opto-electronic sensor in relation to the light spots of the auxiliary measuring tool.

The generated calibration data are stored in the system computer 20 for subsequent measuring processes. If a measuring system comprises a plurality of different auxiliary measuring tools, calibration is carried out for every one of the tools and the corresponding calibration data is stored together with a tool identification. Also stored in the system computer 20 and capable of being activated for a calibration process are algorithms and programs required for the calibration and advantageously also directions for an operator who is to carry out the measuring steps of the calibration process.

Figure 7:
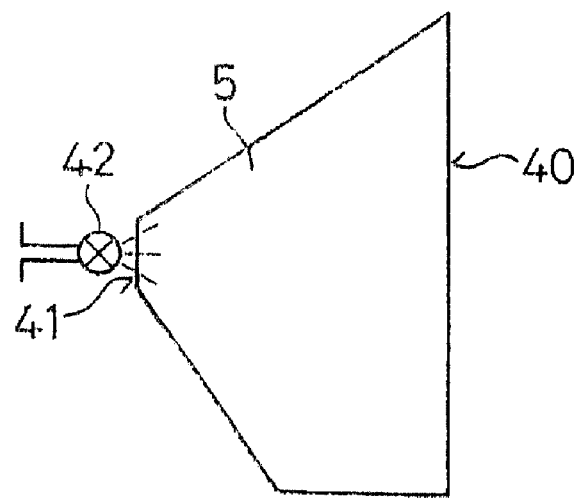

FIG. 7, in a once again very schematic manner, illustrates a cube corner prism applicable as a reflector 5 and at the same time as a light spot. Instead of the effective cube corner, the modified cube corner prism comprises a surface 41 that is parallel to the entrance/exit surface 40 and smaller than the diameter of the measuring beam of the laser tracker. Behind the surface 41, a light source 42, e.g., a light-emitting diode is arranged. The lighted diode makes the surface 41 into a light spot, which is detectable by the opto-electronic sensor. If, in the auxiliary measuring tool according to FIG. 1, instead of the reflector 5 a reflector/light spot combination according to FIG. 7 is used, this point will belong at the same time to the coordinate system of the light spot arrangement and to the coordinate system of the reflector arrangement, rendering calibration more simple. However, registration of the corresponding light spot by the opto-electronic sensor is to be corrected depending on a deviation of the direction between the opto-electronic sensor and the surface 40, on the height of the prism between the surfaces 40 and 41, and on the refractive index of the prism material.

The invention claimed is:

1. A method for calibrating a measuring system comprising a measuring device with a laser tracker and an opto-electronic sensor having fixed positions relative to one another, an auxiliary measuring tool and a system computer, wherein the auxiliary measuring tool comprises one reflector or more than one reflector for reflecting a measuring beam directed on to said one reflector or more than one reflector by the laser tracker and at least three light spots to be registered by the opto-electronic sensor and being arranged in a known light spot arrangement, the method comprising the steps of:
   when said auxiliary measuring tool comprises fewer than three reflectors, coupling the auxiliary measuring tool to an arrangement of auxiliary reflectors such that the total number of reflectors is at least three,
   moving the auxiliary measuring tool, alone or together with the arrangement of auxiliary reflectors, around at least two rotation axes, said at least two rotation axes being different relative to the auxiliary measuring tool,
   registering, in at least two rotation positions for each one of the at least two rotation axes, measured data regarding the total of at least three reflectors and, auxiliary reflectors with the laser tracker and measured data regarding the at least three light spots with the opto-electronic sensor,
   calculating from the measured data of the laser tracker positions and orientations of the reflector arrangement relative to the laser tracker and from the measured data of the opto-electronic sensor positions and orientations of the light spot arrangement relative to the opto-electronic sensor,
   calculating from the positions and orientations of the two arrangements the at least two rotation axes relative to the reflector arrangement and the at least two rotation axes relative to the light spot arrangement, and
   calculating calibration data by equating corresponding rotation axes of the two arrangements and storing the calibration data in the system computer.

2. The method according to claim 1, wherein the at least two rotation axes being different relative to the auxiliary measuring tool are created by mounting the auxiliary measuring tool, alone or together with the arrangement of auxiliary reflectors, in at least two different orientations relative to a stationary rotation axis (C) and by rotating the auxiliary measuring tool in each one of the orientations around the stationary rotation axis (C).

3. The method according to claim 1, wherein the at least two rotation axes being different relative to the auxiliary measuring tool are created by mounting the auxiliary measuring tool, alone or together with the arrangement of auxiliary reflectors, in at least two different first orientations and in at least two different second orientations, wherein the second orientations are selected such that every first orientation is convertible into at least one second orientation by rotation around a stationary, virtual rotation axis (C).

4. The method according to claim 2, wherein the stationary rotation axis (C) passes through a central zone of the reflector arrangement and of the light spot arrangement.

5. The method according to claim 1, wherein the angle between the two rotation axes being different relative to the auxiliary measuring object amounts to between 25 to 30°.

6. The method according to claim 1, wherein, for the step of registering measured data, the optical axis of the opto-electronic sensor is placed approximately on the stationary or virtual rotation axis (C).

7. The method according to claim 6, wherein, for the step of calculating positions and orientations of the light spot arrangement relative to the opto-electronic sensor, an iterative reverse intersection method is utilized.

8. The method according to claim 1, wherein, for the step of calculating positions and orientations of the reflector arrangement relative to the laser tracker, a method of local axis alignment is utilized, wherein the relative positions of the reflectors, alone or with the auxiliary reflectors are determined beforehand.

9. A device for calibrating a measuring system comprising a measuring device with a laser tracker and an opto-electronic sensor having fixed positions relative to one another, an auxiliary measuring tool and a system computer, wherein the auxiliary measuring tool comprises at least one reflectors for reflecting a measuring beam directed on to the at least one reflector by the laser tracker and at least three light spots capable of being registered by the opto-electronic sensor, the light spots being arranged in known positions relative to one another, the device comprising:
   installation means for mounting the auxiliary measuring tool on the device in at least two different orientations; and,
   positioning means for positioning the device relative to the measuring device such that the auxiliary measuring tool amounted on the device can be registered in each one of the orientations by the laser tracker and by the opto-electronic sensor of the measuring device.

10. The device according to claim 9, further comprising a reflector element, the reflector element comprising at least one auxiliary reflector and being mounted in the different orientations, via said installation means, together with the auxiliary measuring tool and rigidly coupled with said tool.

11. The device according to claim 10, wherein the auxiliary measuring tool is adapted for mounting on the reflector element and wherein the reflector element together with the auxiliary measuring tool is adapted for mounting in the at least two orientations.

12. The device according to claim 9, further comprising a revolving table and an orientation element installed on the revolving table, wherein the installation means are arranged on the orientation element.

13. The device according to claim 12, wherein the orientation element is wedge-shaped.

14. The device according to claim 12, wherein the installation means are arranged for the stationary rotation axis (C) of the revolving table to pass through a central zone of the light spot arrangement of the auxiliary measuring tool when mounted by the installation means.

15. The device according to claim 9, further comprising installation means for mounting the auxiliary measuring tool in at least four orientations, wherein groups of at least two of the orientations are convertible into one another by rotation around a stationary, virtual rotation axis.

16. A measuring system comprising:

a measuring device (1) comprising a laser tracker and an opto-electronic sensor having fixed positions relative to one another, an auxiliary measuring tool comprising at least one reflector together with an arrangement of auxiliary reflectors for reflecting a measuring beam directed on to said at least one reflector and auxiliary reflectors by the laser tracker and at least three light spots for being registered by the opto-electronic sensor, the light spots being arranged in a known light spot arrangement, a system computer, for calculating from data measured by the laser tracker, positions and orientations of said at least one reflector and arrangement of auxiliary reflectors relative to the laser tracker and from data measured by the opto-electronic sensor, positions and orientations of the light spot arrangement relative to the opto-electronic sensor;

for calculating from the positions and orientations of the two arrangements, at least two rotation axes relative to the reflector arrangement and at least two rotation axes relative to the light spot arrangement;

for calculating calibration data by equating corresponding rotation axes of the two arrangements and storing the calibration data in the system computer; and comprising a storage space for storing calibration data calculated according to said method, and for carrying out further calculation steps in which the stored calibration data is utilized.

17. The measuring system according to claim 16, wherein the auxiliary measuring tool further comprises means for mounting on a device comprising:

installation means for mounting the auxiliary measuring tool on the device in at least two different orientations; and, positioning means for positioning the device relative to the measuring device such, that the auxiliary measuring tool mounted on the device can be registered in each one of the orientations by the laser tracker and by the opto-electronic sensor of the measuring device.

18. The measuring system according to claim 16, wherein at least one of the reflectors of the auxiliary measuring tool is a cube corner prism in which a corner zone has been removed, and wherein, behind the removed corner zone a light spot to be registered by the opto-electronic sensor is arranged.

* * * * *

UNITED STATES PATENT AND TRADEMARK OFFICE
CERTIFICATE OF CORRECTION

PATENT NO. : 7,180,607 B2 Page 1 of 1
APPLICATION NO. : 10/713325
DATED : February 20, 2007
INVENTOR(S) : Kyle et al.

It is certified that error appears in the above-identified patent and that said Letters Patent is hereby corrected as shown below:

Column 8, Line 27 (Claim 9, Line 5), delete "reflectors" and insert --reflector--.

Column 8, Line 38 (Claim 9, Line 16), delete "amounting" and insert --mounting--.

Signed and Sealed this

Twelfth Day of June, 2007

JON W. DUDAS
*Director of the United States Patent and Trademark Office*